(12) United States Patent  (10) Patent No.: US 8,943,284 B2
Hoffman  (45) Date of Patent: Jan. 27, 2015

(54) SYSTEMS AND METHODS FOR INTEGRATING COMPUTE RESOURCES IN A STORAGE AREA NETWORK

(71) Applicant: Jason Alexander Hoffman, San Francisco, CA (US)

(72) Inventor: Jason Alexander Hoffman, San Francisco, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/829,250

(22) Filed: Mar. 14, 2013

(65) Prior Publication Data

US 2014/0281304 A1  Sep. 18, 2014

(51) Int. Cl.
*G06F 12/16* (2006.01)
*G06F 3/06* (2006.01)

(52) U.S. Cl.
CPC ........................................ *G06F 3/065* (2013.01)
USPC ........................................................ 711/162

(58) Field of Classification Search
None
See application file for complete search history.

(56) References Cited

U.S. PATENT DOCUMENTS

| | | | |
|---|---|---|---|
| 6,088,694 A | 7/2000 | Burns et al. | |
| 6,393,495 B1 * | 5/2002 | Flory et al. | 719/327 |
| 6,553,391 B1 | 4/2003 | Goldring et al. | |
| 6,901,594 B1 * | 5/2005 | Cain et al. | 719/310 |
| 7,222,345 B2 | 5/2007 | Gray et al. | |
| 7,265,754 B2 | 9/2007 | Brauss | |
| 7,379,994 B2 | 5/2008 | Collazo | |
| 7,437,730 B2 | 10/2008 | Goyal | |
| 7,529,780 B1 | 5/2009 | Braginsky et al. | |
| 7,581,219 B2 | 8/2009 | Neiger et al. | |
| 7,603,671 B2 | 10/2009 | Liu | |
| 7,640,547 B2 | 12/2009 | Neiman et al. | |
| 7,685,148 B2 | 3/2010 | Engquist et al. | |
| 7,774,457 B1 | 8/2010 | Talwar et al. | |
| 7,814,465 B2 | 10/2010 | Liu | |
| 7,849,111 B2 | 12/2010 | Huffman et al. | |
| 7,899,901 B1 | 3/2011 | Njemanze et al. | |
| 7,904,540 B2 | 3/2011 | Hadad et al. | |
| 7,917,599 B1 | 3/2011 | Gopalan et al. | |

(Continued)

FOREIGN PATENT DOCUMENTS

| | | |
|---|---|---|
| WO | 2011/088224 | 7/2011 |
| WO | WO2012125143 | 9/2012 |
| WO | WO2012125144 | 9/2012 |

OTHER PUBLICATIONS

I/O throttling, Michael Mesnier, 2006.*

(Continued)

*Primary Examiner* — Duc Doan
(74) *Attorney, Agent, or Firm* — Carr & Ferrell LLP

(57) ABSTRACT

A data processing and storage system includes a compute module for running at least one virtual machine for processing guest data. State data on the at least one virtual machine is collected. The system also includes a storage module communicating with the compute module and storing the guest data. The storage module accesses the state data for controlling storage operations. A cloud storage/compute system is provided that includes a storage module for storing guest data for a virtual machine and operating based on a clock. The cloud storage/compute system also includes a compute module coupled to the storage module for performing operations on the guest data for the virtual machine and operating based on the clock. A method is provided that includes collecting state data on a virtual machine that processes guest data, and controlling storage operations relating to the guest data based on the state data.

21 Claims, 6 Drawing Sheets

(56) References Cited

U.S. PATENT DOCUMENTS

| | | |
|---|---|---|
| 7,933,870 B1 | 4/2011 | Webster |
| 7,940,271 B2 | 5/2011 | Wright et al. |
| 8,006,079 B2 | 8/2011 | Goodson et al. |
| 8,010,498 B2 | 8/2011 | Gounares et al. |
| 8,141,090 B1 | 3/2012 | Graupner et al. |
| 8,181,182 B1 | 5/2012 | Martin |
| 8,244,559 B2 | 8/2012 | Horvitz et al. |
| 8,301,746 B2 | 10/2012 | Head et al. |
| 8,336,051 B2 | 12/2012 | Gokulakannan |
| 8,346,935 B2 | 1/2013 | Mayo et al. |
| 8,370,936 B2 | 2/2013 | Zuk et al. |
| 8,417,673 B2 | 4/2013 | Stakutis et al. |
| 8,417,746 B1 | 4/2013 | Gillett, Jr. et al. |
| 8,429,282 B1 | 4/2013 | Ahuja et al. |
| 8,434,081 B2 | 4/2013 | Cervantes et al. |
| 8,464,251 B2 | 6/2013 | Sahita et al. |
| 8,468,251 B1 | 6/2013 | Pijewski et al. |
| 8,547,379 B2 | 10/2013 | Pacheco et al. |
| 8,555,276 B2 | 10/2013 | Hoffman et al. |
| 8,631,131 B2 | 1/2014 | Kenneth et al. |
| 8,677,359 B1 | 3/2014 | Cavage et al. |
| 8,775,485 B1 | 7/2014 | Cavage et al. |
| 8,782,224 B2 | 7/2014 | Pijewski et al. |
| 8,789,050 B2 | 7/2014 | Hoffman et al. |
| 8,793,688 B1 | 7/2014 | Mustacchi et al. |
| 8,826,279 B1 | 9/2014 | Pacheco et al. |
| 8,881,279 B2 | 11/2014 | Gregg |
| 8,898,205 B2 | 11/2014 | Cavage et al. |
| 2002/0069356 A1 | 6/2002 | Kim |
| 2002/0082856 A1 | 6/2002 | Gray et al. |
| 2002/0156767 A1* | 10/2002 | Costa et al. ......... 707/1 |
| 2002/0198995 A1 | 12/2002 | Liu et al. |
| 2003/0154112 A1 | 8/2003 | Neiman et al. |
| 2003/0163596 A1* | 8/2003 | Halter et al. ......... 709/315 |
| 2004/0088293 A1* | 5/2004 | Daggett ............. 707/6 |
| 2005/0097514 A1 | 5/2005 | Nuss |
| 2005/0108712 A1 | 5/2005 | Goyal |
| 2005/0188075 A1 | 8/2005 | Dias et al. |
| 2006/0107087 A1 | 5/2006 | Sieroka et al. |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0248294 A1 | 11/2006 | Nedved et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1 | 8/2007 | Croft et al. |
| 2007/0250838 A1 | 10/2007 | Belady et al. |
| 2007/0271570 A1 | 11/2007 | Brown et al. |
| 2008/0080396 A1 | 4/2008 | Meijer et al. |
| 2008/0103861 A1 | 5/2008 | Zhong |
| 2008/0155110 A1 | 6/2008 | Morris |
| 2009/0044188 A1 | 2/2009 | Kanai et al. |
| 2009/0077235 A1 | 3/2009 | Podila |
| 2009/0164990 A1* | 6/2009 | Ben-Yehuda et al. ......... 718/1 |
| 2009/0172051 A1 | 7/2009 | Huffman et al. |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1* | 10/2009 | Beaty et al. ......... 718/1 |
| 2009/0300210 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0114825 A1* | 5/2010 | Siddegowda ......... 707/638 |
| 2010/0125845 A1 | 5/2010 | Sugumar et al. |
| 2010/0131324 A1 | 5/2010 | Ferris |
| 2010/0131854 A1* | 5/2010 | Little ............. 715/735 |
| 2010/0153958 A1 | 6/2010 | Richards et al. |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0228936 A1* | 9/2010 | Wright et al. ......... 711/163 |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0268764 A1 | 10/2010 | Wee et al. |
| 2010/0299313 A1 | 11/2010 | Orsini et al. |
| 2010/0306765 A1 | 12/2010 | DeHaan |
| 2010/0306767 A1 | 12/2010 | Dehaan |
| 2010/0318609 A1 | 12/2010 | Lahiri et al. |
| 2010/0332262 A1 | 12/2010 | Horvitz et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 | 2/2011 | Arasaratnam |
| 2011/0047315 A1* | 2/2011 | De Dinechin et al. ......... 711/6 |
| 2011/0055377 A1 | 3/2011 | DeHaan |
| 2011/0055396 A1 | 3/2011 | DeHaan |
| 2011/0055398 A1 | 3/2011 | Dehaan et al. |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1* | 7/2011 | Mayo et al. ......... 709/213 |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0302378 A1 | 12/2011 | Siebert |
| 2011/0302583 A1 | 12/2011 | Abadi et al. |
| 2011/0320520 A1 | 12/2011 | Jain |
| 2012/0017210 A1 | 1/2012 | Huggins et al. |
| 2012/0054742 A1* | 3/2012 | Eremenko et al. ......... 718/1 |
| 2012/0060172 A1 | 3/2012 | Abouzour |
| 2012/0066682 A1 | 3/2012 | Al-Aziz et al. |
| 2012/0079480 A1 | 3/2012 | Liu |
| 2012/0089980 A1 | 4/2012 | Sharp et al. |
| 2012/0124211 A1 | 5/2012 | Kampas et al. |
| 2012/0131156 A1 | 5/2012 | Brandt et al. |
| 2012/0131591 A1 | 5/2012 | Moorthi et al. |
| 2012/0159507 A1 | 6/2012 | Kwon et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0185913 A1 | 7/2012 | Martinez et al. |
| 2012/0198442 A1 | 8/2012 | Kashyap et al. |
| 2012/0204176 A1 | 8/2012 | Tian et al. |
| 2012/0221845 A1 | 8/2012 | Ferris |
| 2012/0233315 A1 | 9/2012 | Hoffman et al. |
| 2012/0233626 A1 | 9/2012 | Hoffman et al. |
| 2012/0246517 A1 | 9/2012 | Bender et al. |
| 2012/0266231 A1 | 10/2012 | Spiers et al. |
| 2012/0284714 A1 | 11/2012 | Venkitachalam et al. |
| 2012/0303773 A1* | 11/2012 | Rodrigues ......... 709/223 |
| 2012/0311012 A1 | 12/2012 | Mazhar et al. |
| 2013/0042115 A1 | 2/2013 | Sweet et al. |
| 2013/0060946 A1 | 3/2013 | Kenneth et al. |
| 2013/0067067 A1* | 3/2013 | Miri et al. ......... 709/224 |
| 2013/0081016 A1 | 3/2013 | Saito et al. |
| 2013/0086590 A1 | 4/2013 | Morris et al. |
| 2013/0129068 A1 | 5/2013 | Lawson et al. |
| 2013/0132057 A1 | 5/2013 | Deng et al. |
| 2013/0169666 A1 | 7/2013 | Pacheco et al. |
| 2013/0173803 A1 | 7/2013 | Pijewski et al. |
| 2013/0179881 A1 | 7/2013 | Calder et al. |
| 2013/0191835 A1 | 7/2013 | Araki |
| 2013/0191836 A1 | 7/2013 | Meyer |
| 2013/0254407 A1 | 9/2013 | Pijewski et al. |
| 2013/0318525 A1 | 11/2013 | Palanisamy et al. |
| 2013/0328909 A1 | 12/2013 | Pacheco et al. |

(56) References Cited

U.S. PATENT DOCUMENTS

| | | |
|---|---|---|
| 2013/0339966 A1 | 12/2013 | Meng et al. |
| 2013/0346974 A1 | 12/2013 | Hoffman et al. |
| 2014/0279955 A1 | 9/2014 | Cavage et al. |
| 2014/0280198 A1 | 9/2014 | Cavage et al. |
| 2014/0280796 A1 | 9/2014 | Pijewski |
| 2014/0280912 A1 | 9/2014 | Gregg |
| 2014/0280970 A1 | 9/2014 | Pijewski et al. |
| 2014/0282512 A1 | 9/2014 | Pacheco et al. |
| 2014/0282513 A1 | 9/2014 | Pacheco et al. |
| 2014/0282590 A1 | 9/2014 | Cavage et al. |
| 2014/0282615 A1 | 9/2014 | Cavage et al. |
| 2014/0283053 A1 | 9/2014 | Gregg |

OTHER PUBLICATIONS

Yagoubi, Belabbas et al., "Load Balancing in Grid Computing," Asian Journal of Information Technology, vol. 5, No. 10, pp. 1095-1103, 2006.

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Gregg, Brendan, "Visualizing System Latency," May 1, 2010, ACM Queue, p. 1-13, http://queue.acm.org/detail.cfm?id=1809426.

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

Bi et al. "Dynamic Provisioning Modeling for Virtualized Multi-tier Applications in Cloud Data Center". 2010 IEEE 3rd International Conference on Cloud Computing. pp. 370-377.

Chappell, David. "Introducing Windows Azure". Microsoft Corporation. Oct. 2010. pp. 1-25.

Chef Documents. Retrieved Mar. 11, 2014 from http://docs.opscode.com/.

Ansible Documentation. Retrieved Mar. 11, 2014 from http://docs.ansible.com/.

Bill Pijewski's Blog. Retrieved Mar. 12, 2014 from http://dtrace.org/blogs/wdp/2011/03/our-zfs-io-throttle/.

Brendan's Blog. Retrieved Mar. 12, 2014 from http://dtrace.org/blogs/brendan/2011/03/08/busy-week-zfs-throttling-dtrace-node-js-and-cloud-analytics/.

Joyent ZFS Performance Analysis and Tools. Retrieved Mar. 12, 2014 from http://www.slideshare.net/brendangregg/zfsperftools2012.

Block 10 Controller. Retrieved Mar. 12, 2014 from https://www.kernel.org/doc/Documentation/cgroups/blkio-controller.txt.

Block Device Bio Throttling Support. Retrieved Mar. 12, 2014 from https://lwn.net/Articles/403889/.

Gregg, Brendan. Systems Performance: Enterprise and the Cloud, Prentice Hall, 2014, pp. 557-558.

International Search Report and Written Opinion of the International Searching Authority mailed Sep. 1, 2011 in Patent Cooperation Treaty Application No. PCT/US2011/021157 filed Jan. 13, 2011.

International Search Report and Written Opinion of the International Searching Authority mailed May 19, 2011 in Patent Cooperation Treaty Application No. PCT/US2011/028234 filed Mar. 11, 2011.

International Search Report and Written Opinion of the International Searching Authority mailed May 5, 2011 in Patent Cooperation Treaty Application No. PCT/US2011/028230, filed Mar. 11, 2011.

\* cited by examiner

SYSTEMS AND METHODS FOR INTEGRATING COMPUTE RESOURCES IN A STORAGE AREA NETWORK

FIELD OF THE INVENTION

The present invention relates to systems and methods for a cloud computing infrastructure. More particularly, the present invention relates to a system and method for integrating compute resources in a storage area network.

BACKGROUND

Cloud infrastructure, including storage and processing, is an increasingly important resource for businesses and individuals. Using a cloud infrastructure enables businesses to outsource all or substantially all of their information technology (IT) functions to a cloud service provider. Businesses using a cloud service provider benefit from increased expertise supporting their IT function, higher capability hardware and software at lower cost, and ease of expansion (or contraction) of IT capabilities.

Monitoring a cloud infrastructure is an important function of cloud service providers, and continuity of function is an important selling point for cloud service providers. Downtime due to malware or other failures should be avoided to ensure customer satisfaction. Cloud infrastructure monitoring conventionally includes network packet sniffing, but this is impractical as a cloud infrastructure scales up. Alternatively, host-based systems conventionally collect and aggregate information regarding processes occurring within the host.

SUMMARY OF THE INVENTION

According to exemplary embodiments, the present technology provides a data processing and storage system. The system may include a compute module for running at least one virtual machine for processing guest data. State data on the at least one virtual machine is collected. The system also includes a storage module communicating with the compute module and storing the guest data. The storage module accesses the state data for controlling storage operations.

The state data may include a process identifier, a username, a central processing unit usage, a memory identifier, an internal application identifier, and/or an internal application code path. The state data may be used to dynamically modify control software of the storage module. The state data may be used to manage input/output throttling of the guest data with respect to the storage module. The state data may be accessible by a system administrator for determining and/or modifying resource usage related to the guest data.

The system may include a clock accessible by the compute module and the storage module for managing operations. The system may include a debug module adapted to access the state data and provide a stack trace for the compute module and the storage module.

The storage module may store a read-only copy of a virtual machine operating system for instantiating new instances of virtual machines in the compute module.

A cloud storage/compute system is provided that includes a storage module for storing guest data for a virtual machine and operating based on a clock. The cloud storage/compute system also includes a compute module communicatively coupled with the storage module for performing operations on the guest data for the virtual machine and operating based on the clock. Clock data may be associated with storage module operations data and compute module operations data.

The system may include a cloud system administrator module accessing the storage module operations data and the compute module operations data for managing operations. The system may include a debug module accessing the storage module operations data and the compute module operations data for providing a stack trace.

A method is provided that includes collecting state data on a virtual machine that processes guest data. The method also includes controlling storage operations relating to the guest data based on the state data.

The method may include communicating by the virtual machine the guest data to a storage module, and storing the guest data in the storage module. The method may include storing in the storage module a read-only copy of a virtual machine operating system for instantiating new instances of virtual machines. The method may further include storing in the storage module modifications to the virtual machine in an instance image file.

These and other advantages of the present technology will be apparent when reference is made to the accompanying drawings and the following description.

DETAILED DESCRIPTION OF EXEMPLARY EMBODIMENTS

Figure 1:
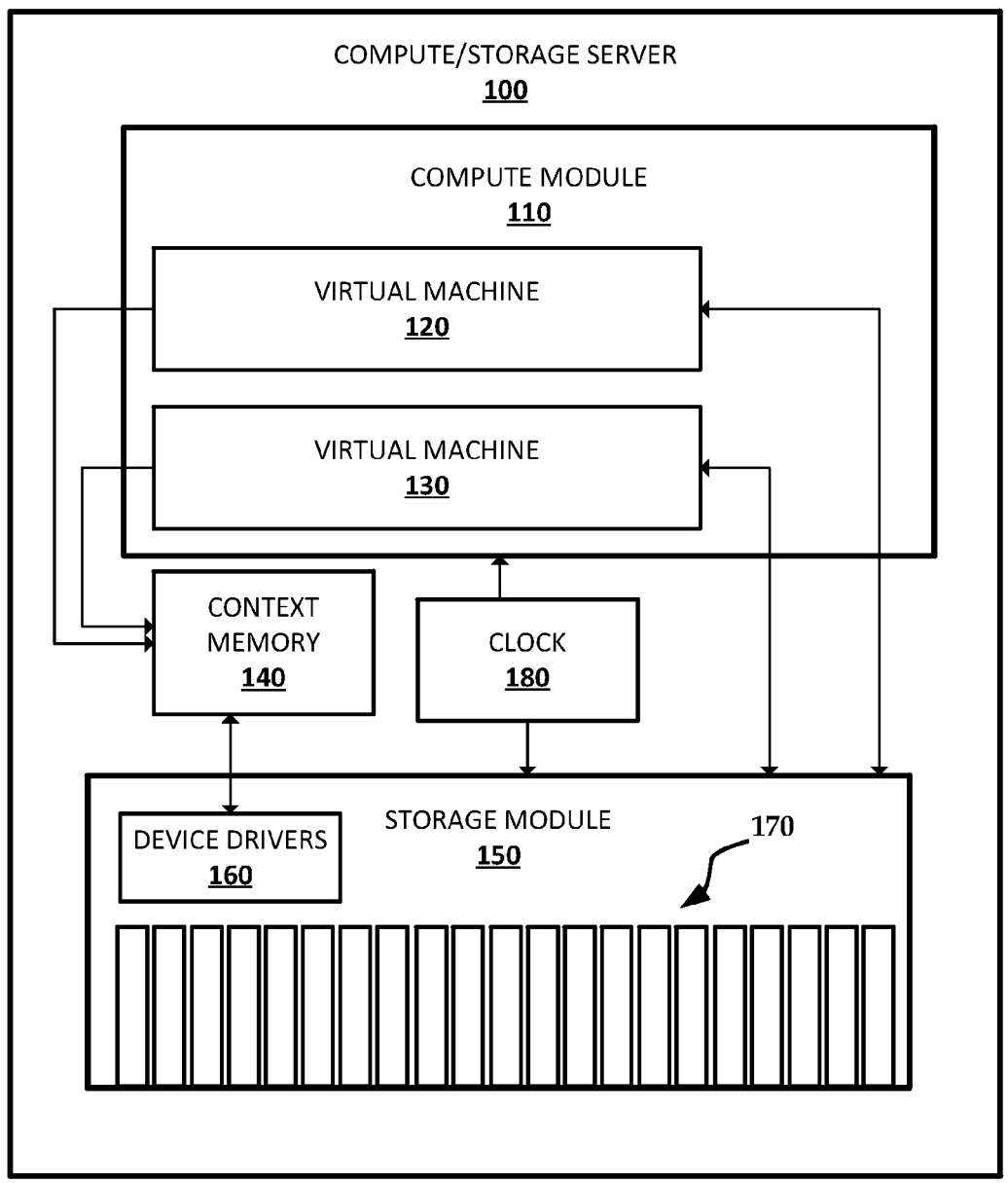
FIG. 1 is a diagram illustrating an exemplary embodiment of a compute/storage server.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The present technology provides a unified compute and storage model for a datacenter. The present technology modifies storage area network (SAN) model and provides compute as a service to a SAN. The present technology enables a datacenter administrator to answer customer queries that are difficult to answer in a conventional SAN model. For example, using a SAN model, a system administrator is not able to quickly and easily respond to questions presented by a customer such as: "why is it slow?"; "why is it down?"; "when is it coming back?"; and "when it comes back, will it be OK?". Conventional datacenters built on the SAN model cannot do a socket-to-socket analysis and do not provide transparency enabling an administrator to properly answer these questions.

The present technology may provide cost optimization across a complete range of different instance types, and may provide a system and method for running a virtual machine natively on a modified storage area network. A multi-datacenter object store is provided by relaxing a policy around compute, and by providing the same core object system for a multi-datacenter object store (a primary system of record). The present technology brings compute functionality to the data store, and thereby provides unique capabilities to query, index, MapReduce, transform, and/or perform any other compute function directly on the object store without having to move data.

The present technology collapses the conventional SAN model by combining storage and compute. Policies, security and software are updated to handle this architecture pursuant to the present technology. Storage volumes may be optimized for storage. An integrated compute/SAN according to the present technology enables I/O throttling for tenants (also referred to as guests or virtual machines) based on co-tenant operations, and through the proper implementation of operating software may enable awareness of co-tenant (also referred to as neighbors) operations affecting common resources.

Advantages of the present technology include increased predictability and control, as well as improved unit economics. The present technology also enables improved network, compute and storage integration with end-user needs. The present technology avoids hard allocation of compute and storage resources, and redirects the datacenter model to be about data, including both storage and manipulation. In this manner, the present technology ensures that storage resources are synchronized with compute needs of a guest by providing dynamic allocation of storage and computer resources.

The improved observability enabled by the present technology includes visualization of storage latency, I/O latency, and the effects of I/O on other tenants. With the known latencies being determined, latencies for I/O may be controlled, by for instance, instituting delays for high I/O users in order to prevent impairment of neighbor guests using the same storage unit. Improved observability may be enabled in part by compute and storage resources utilizing the same clock. The present technology also enables an administrator of the datacenter to identify code paths for I/O for each guest.

By integrating compute and storage in the same server in a datacenter, context information relating to a processor or processors (also referred to as a CPU) may be stored and used to control storage operations. This information relating to computer operations is conventionally lost if a datacenter is built from parts from different manufacturers and connected over a network. The context information (also referred to as state data, state and statistics) may be tenant specific. For example, an administrator may identify that a guest is using a large amount of I/O in the storage. Using the present technology, the administrator may also be able to access context to identify that a failover has occurred, such that the virtual machine is replaced by a new virtual machine. The state data may include a process identifier, a username, a central processing unit usage, a memory identifier, an internal application identifier and/or an internal application code path.

A common clock between storage and compute modules of a compute/storage server in a datacenter enables analysis by an administrator of the host operating system of the datacenter. The present technology enables an analysis of all I/O activity of SAN components of the present technology, and further enables tracking the data flows in and out of the SAN, in real-time. Further, the identified I/O may be correlated with processes running on a virtual machine. Time-series based correlations are possible, and the present technology may utilize DTrace and/or other debugging software to provide a clear view of operations up and down a stack by identifying processes.

The present technology may provide ease of management by creating virtual machines (also referred to as instances, tenants, and guests) from a single copy of the software. The read-only copy of the virtual operating system may be stored in the storage component of the rack in which the virtual machine operates in the compute component. Instantiation of the virtual machine may be performed very quickly by accessing the storage component directly from the compute component. Additionally, since (in some embodiments) only the difference (also referred to as the delta) in the operating system file is saved as a new file, the various copies of virtual machine operating systems for all, or at least a plurality of the guests of the host machine may occupy a much smaller amount of disk (or other appropriate) storage. A modified virtual OS may therefore be stored as pointers directed to the read-only copy of the operating system and other pointers directed to the delta file. Accessing the read-only copy of the virtual machine along with the delta file when starting another instance based on the modified virtual machine may also be performed very quickly.

Different images for databases, node.js (a platform built on Chrome's Javascript runtime for building fast, scalable network applications), and MySQL are commonly stored and offered to customers. In this manner, configuring a new virtual machine may be seamless and quick, since the copy-on-write system exists on the same machine including both compute and storage. In this manner, the process of creating a new instance is vastly accelerated. ZFS may be utilized as the file storage system of the present application.

An exemplary hardware embodiment uses the rack as the primary unit and offers four rack designs. The exemplary hardware embodiment may draw substantially constant power, for example 8 kW, and may be based on the same board, CPUs, DRAM, HBAs (Host Bus Adapter) and ToR (The Onion Routing). The exemplary hardware embodiment may require only minimal firmware.

Exemplary compute racks for the present technology include, but are not limited to, any of the following: 1) 512 CPUs, 4 TB DRAM, all 600 GB SAS (68 TB); 2) 512 CPUs, 4 TB DRAM, all 3 TB SAS (600 TB); and 3) 512 CPUs, 4 TB DRAM, all 800 GB SSDs (90 TB/200 TB). Object storage racks according to an exemplary embodiment may include, but are not limited to, 256 CPUs, 4 TB DRAM, all 3 TB/4 TB SATA (800 TB).

FIG. 1 is a diagram illustrating an exemplary compute/storage server 100. Compute/storage server 100 includes compute module 110 and storage module 150. Compute module 110 may be composed of processors (also referred to as processing units, central processing units, and CPUs). Compute module 110 may be used to instantiate one or more virtual machines, for instance virtual machine 120 and virtual machine 130. Virtual machine 120 and virtual machine 130 may operate as guests (also referred to as tenants) on host machine, and may run for the benefit of one or more customers of the datacenter operator. Virtual machine 120 and virtual machine 130 may, after processing, output guest data to storage module 150 for persistent storage in disks 170 of storage module 150. In alternative exemplary embodiments, disks 170 may be any other appropriate memory device for persistent data storage.

Virtual machine 120 and virtual machine 130 may output context data to context memory 140. Context data may be state data of virtual machine 120 and virtual machine 130, and may include process identifiers within each virtual machine, usernames for each virtual machine, central processing unit usage for each virtual machine, memory identifiers for each virtual machine, internal application identifiers for each virtual machine and/or internal application code paths for each virtual machine. Context memory 140 may couple to device drivers 160 of storage module 150. Alternatively, context memory 140 may couple to other software elements of storage module 150. Context data may be transferred by context memory 140 to device drivers 160 (or other software elements of storage module 150) and may be used to assist in the operation of storage module 150 and/or disks 170. In particular, context data may be used to dynamically modify device drivers 160. In this manner, data relating to the operation of virtual machine 120 and virtual machine 130 may be used as an input to storage module 150 and may be used to modify a storage algorithm. Likewise, data relating to the processing elements of compute module 110 used to run virtual machine 120 and virtual machine 130 may be also used as an input to storage module 150 and may be used to modify a storage algorithm. Additionally, device drivers 160 (or other software storage control elements of storage module 150) may output data relating to storage operations to context memory 140, and this data may be matched or correlated with data received from machine 120 and virtual machine 130 for use by a system administrator.

Compute/storage server 100 also includes clock 180, which may be accessed by both compute module 110 and storage module 150. Due to the fact that the operations of compute module 110 and storage module 150 may both be based on clock 180, time stamps associated with the operations of the respective modules may be correlated, either in context memory 140, another module in compute/storage server 100, in a system administrator server, and/or elsewhere.

Figure 2:
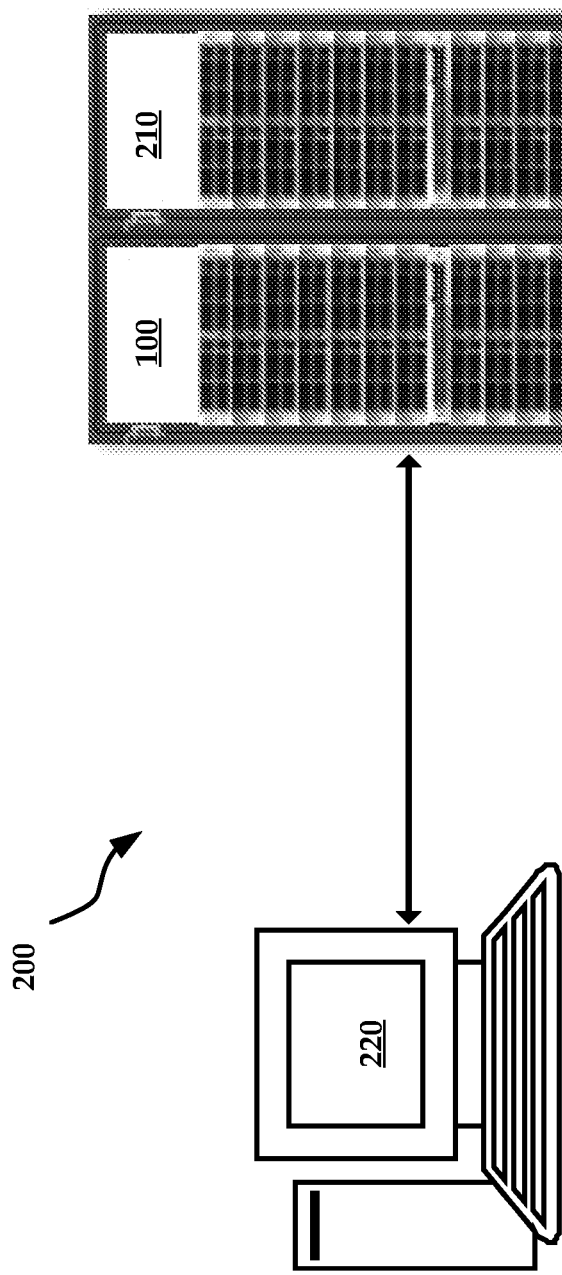
FIG. 2 is a system level diagram illustrating an exemplary embodiment of a compute/storage server and datacenter administrator.

FIG. 2 is a system level diagram illustrating datacenter 200 including compute/storage servers 100 and 210, and administrator terminal 220. Administrator terminal 220 may be used to control all or a portion of datacenter 200, and/or may be used to operate multiple datacenters. Administrator terminal 220 may communicatively couple with context memory 140 of compute/storage server 100, and/or may monitor the operations of compute module 110 and/or storage module 150. In this manner, the present technology enables a datacenter administrator to observe operations of compute and storage to a degree that was previously impossible. In particular, the internal processes of a virtual machine may be identified and visualized, and may be correlated with input/output operations of storage module 150. Clock data for context data as well as all other data received from compute/storage server 100 is inherently synchronized since all of the operations within compute/storage server 100 are performed based on clock 180.

Figure 3:
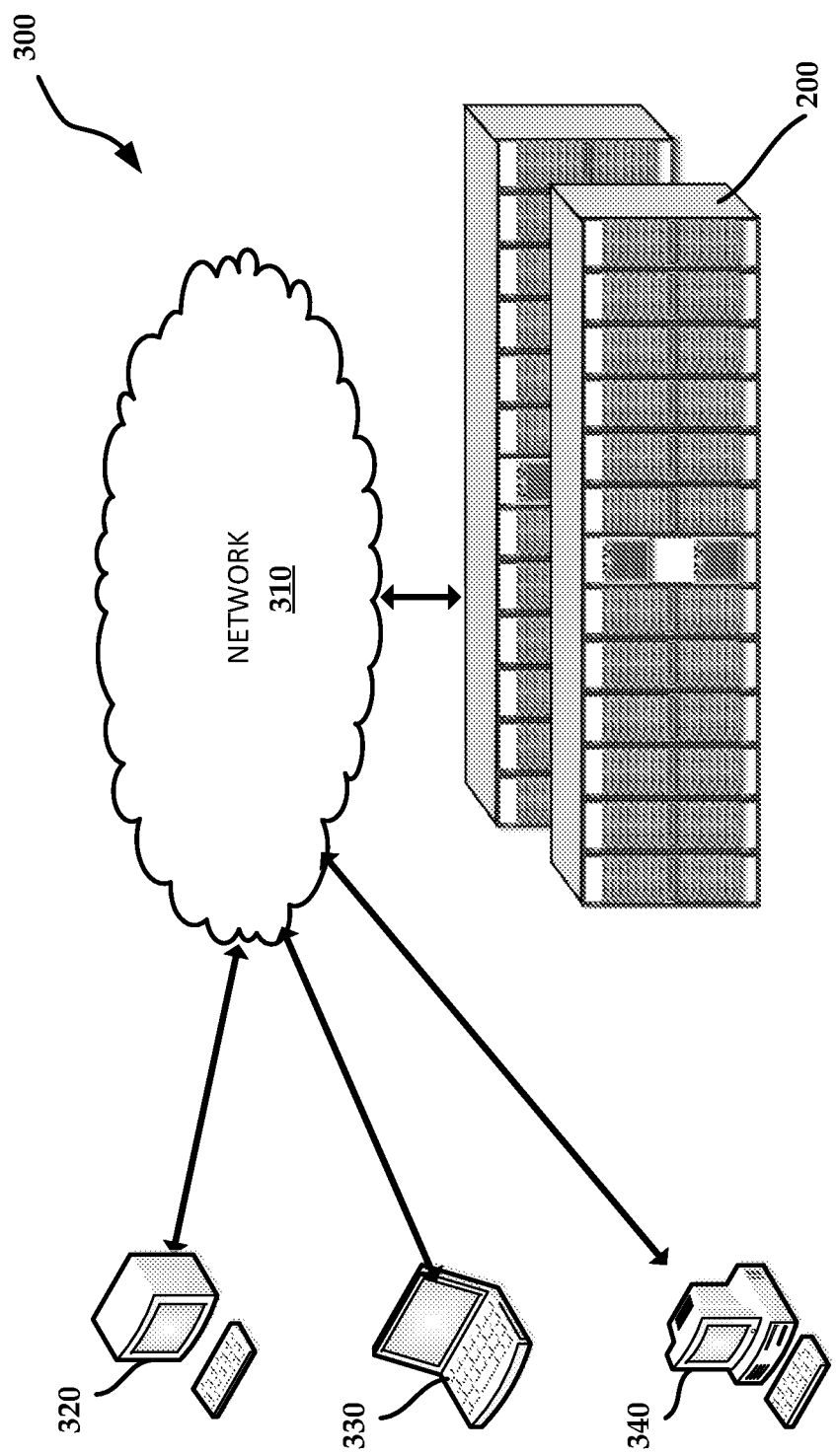
FIG. 3 is a diagram illustrating an exemplary embodiment of a cloud-based data storage and processing system.

FIG. 3 illustrates cloud-based data storage and processing system 300. Cloud-based data storage and processing system 300 includes datacenter 200 communicatively coupled to network 310. Network 310 may be a wide-area network (WAN), a local area network (LAN), the internet, or any other appropriate network. Customers may access cloud-based data storage and processing system 300 by using any of customer terminal 320, customer laptop 330, and/or customer personal computer 340 (or the like) to access network 310.

Figure 4:
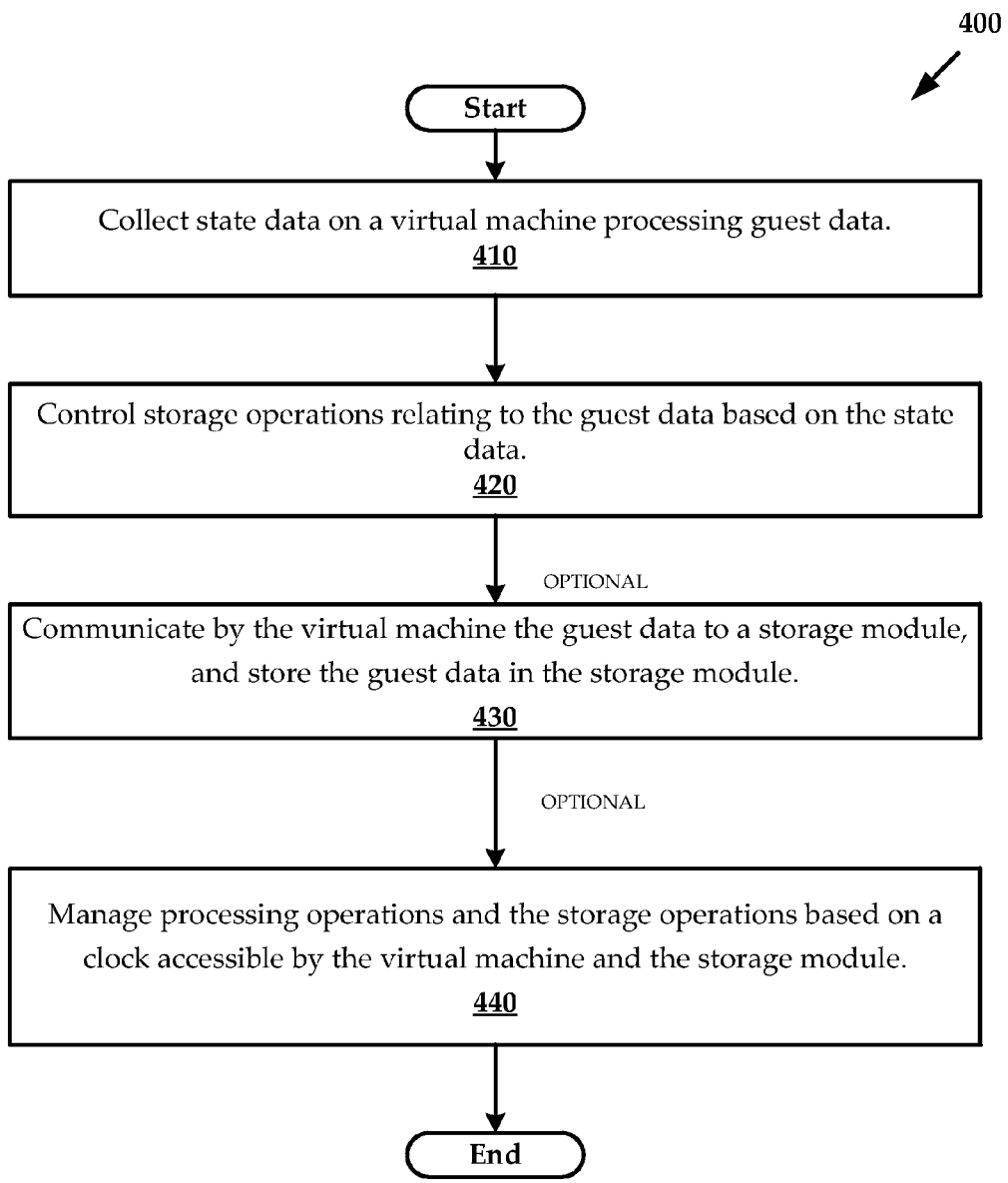
FIG. 4 is a flow chart illustrating an exemplary method.

FIG. 4 illustrates method 400 according to the present technology. Method 400 proceeds from a start oval to operation 410, which indicates to collect state data on a virtual machine processing guest data. From operation 410, the flow proceeds to operation 420, which indicates to control storage operations relating to the guest data based on the state data. From operation 420, the flow optionally proceeds to operation 430, which indicates to communicate by the virtual machine the guest data to a storage module, and to store the guest data in the storage module. From operation 430, the flow optionally proceeds to operation 440, which indicates to manage processing operations and the storage operations based on a clock accessible by the virtual machine and the storage module. From operation 440, the flow proceeds to end oval.

Figure 5:
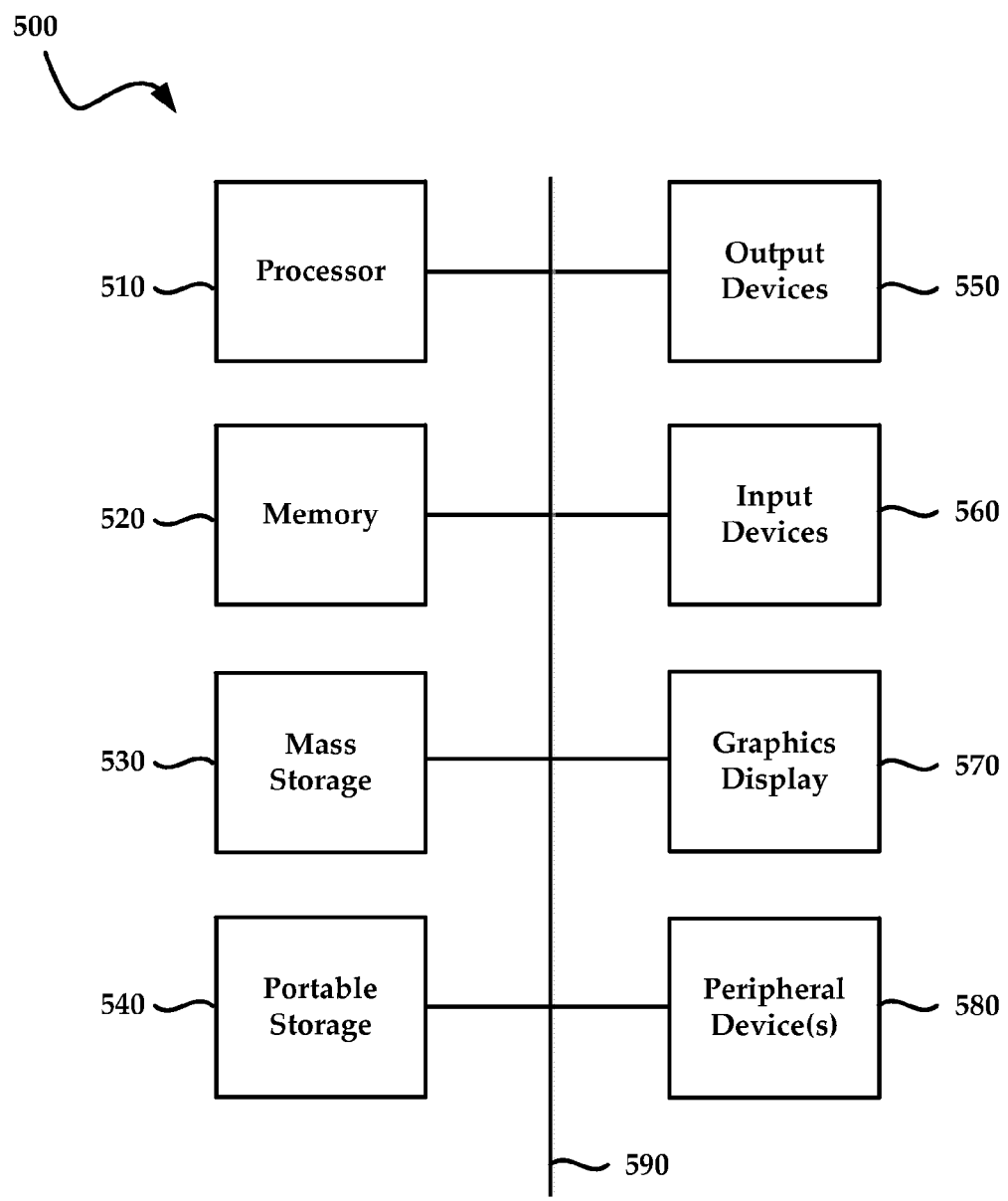
FIG. 5 is a schematic of a computer system according to an exemplary embodiment.

FIG. 5 illustrates an exemplary computing system 500 that may be used to implement an embodiment of the present technology. For example, computer/storage servers 100 and 210, administrator terminal 220, network 310, customer terminal 320, customer laptop 330 and/or customer personal computer 340 may be implemented by one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by processor 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Figure 6:
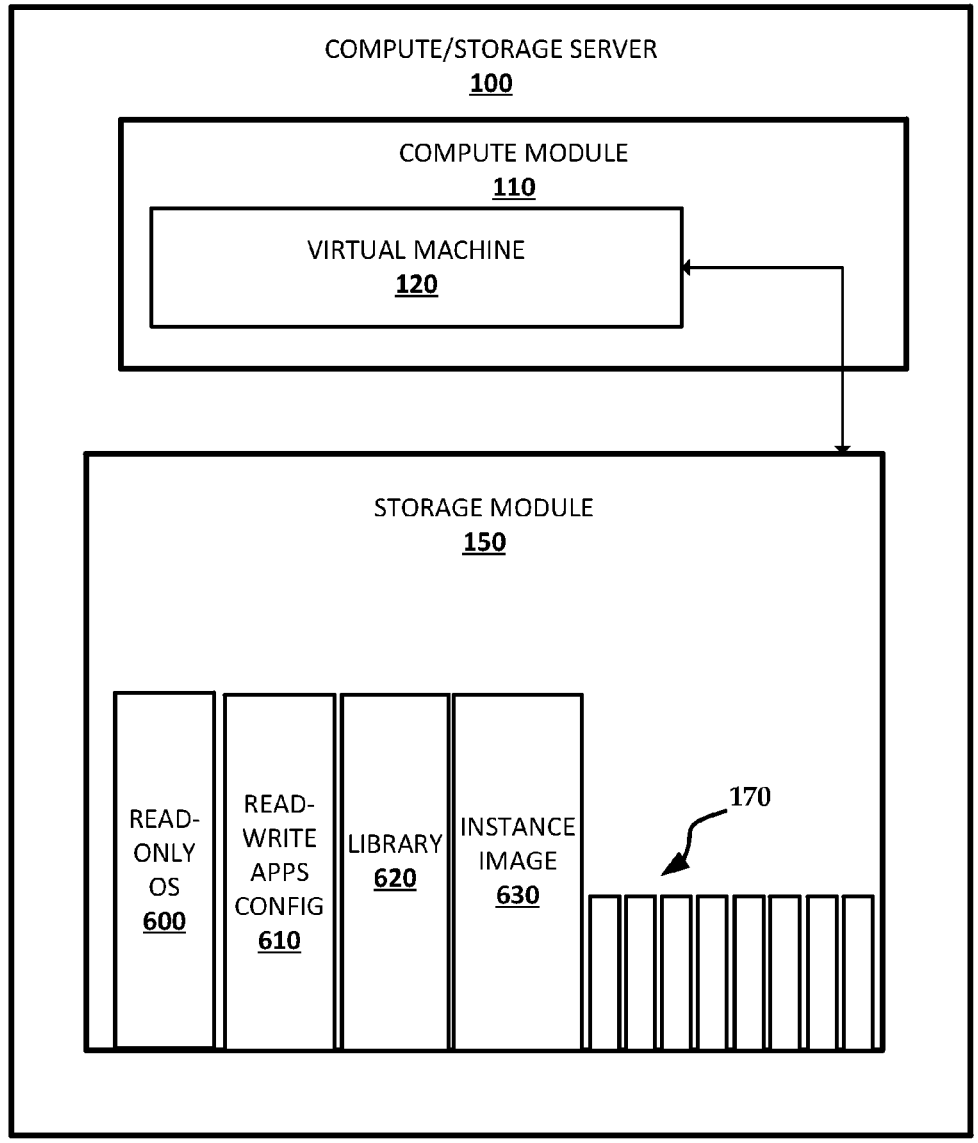
FIG. 6 is a diagram illustrating another exemplary embodiment of a compute/storage server.

FIG. 6 is a diagram illustrating another exemplary embodiment of compute/storage server 100. Compute/storage server 100 includes compute module 110 and storage module 150. Compute module 110 may be composed of processors and may be used to instantiate one or more virtual machines, for instance virtual machine 120, operating as a guest. Storage module 150 may include disks 170, and disks 170 may include read-only OS disk 600, read-write apps config disk 610, library disk 620 and instance image disk 630. As discussed previously, disks 170, read-only OS disk 600, read-write apps config disk 610, library disk 620 and/or instance image disk 630 may be any other appropriate memory device suitable for persistent data storage. Additionally, read-only OS disk 600, read-write apps config disk 610, library disk 620 and instance image disk 630 may instead be collectively stored on one disk, or may be stored on more than three disks.

Virtual machine 120 may be instantiated based on a copy-on-write methodology. In particular, when an administrator of the datacenter and/or a customer desires a new virtual machine, compute module 110 may access read-only OS disk 600 of storage module 150. Alternatively, the administrator or customer may desire a particular type of virtual machine, for instance a database or a virtual machine based on node.js and/or MySQL. Due to the direct access of compute module 110 to storage module 150, the instantiation of a virtual machine may be performed very quickly. If the customer or administrator modifies the virtual machine, the changes to the system may be stored in a delta file stored in instance image disk 630, and a pointer file may provide a map to selectively access read-only OS disk 600 and instance image disk 630. Additionally, if a customer or the datacenter administrator wants to make a copy of a previously modified virtual machine, compute module 110 may access the read-only copy of the operating system for the virtual machine stored in read-only OS disk 600 and the modifications stored in instance image disk 630, based on the contents of the pointer file.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A storage area network system, comprising:
an object store comprising a plurality of tenants;
a compute module for:
assigning to each of the plurality of tenants a virtual machine,
instantiating the virtual machine for each of the plurality of tenants directly on the object store;
running at least one virtual machine that is used to process guest data in the object store using at least one compute function that is executed directly on the object store in such a way that data is not moved from the object store, each of the compute operations having a timestamp generated by a clock;
collecting context data about each of the virtual machines of the plurality of tenants a storage module for:
communicating with the compute module and executing storage operations for storing the guest data, the storage module accessing the context data for controlling storage operations, each of the storage operations comprising a timestamp generated by the clock, each of the compute operations and the storage operations comprising timestamps respectively; and
a context memory for:
storing context data generated by the virtual machine, the context memory being coupled to device drivers of the storage module, the context data being used to dynamically modify the device drivers, the context data comprising a correlation of the storage operations and the compute operations using the timestamps of the storage operations and the timestamps of the compute operations, wherein the timestamps associated with the storage operations are correlated with the timestamps associated with the compute operations, in the context memory.

2. The system of claim 1, wherein the context data is used to dynamically modify control software of the storage module.

3. The system of claim 2, wherein the context data is used to manage input/output throttling of the guest data with respect to the storage module.

4. The system of claim 1, wherein the context data is accessible by a system administrator for at least one of determining and modifying resource usage related to the guest data.

5. The system of claim 1, further comprising a clock accessible by the compute module and the storage module for managing operations.

6. The system of claim 1, further comprising a debug module adapted to access the context data and provide a stack trace for the compute module and the storage module.

7. The system of claim 1, wherein the storage module stores a read-only copy of a virtual machine operating system for instantiating new instances of virtual machines in the compute module, the storage module further storing modifications to the virtual machine operating system in a delta file on an image disk, separately from the read-only copy of the virtual machine operating system, the delta file being associated with the read-only copy of the virtual machine operating system by a pointer file.

8. An object store, comprising:
a storage module for executing storage operations comprising storing guest data for a virtual machine and operating based on a clock, each of the storage operations comprising a timestamp, context data about the virtual machine being collected, wherein the context data comprises an internal application identifier and an internal application code path for the virtual machine;
a compute module coupled to the storage module for performing compute operations on the guest data for the virtual machine and operating based on the clock each of the storage operations comprising a timestamp respectively; and
a context memory for storing context data generated by the virtual machine, the context memory being coupled to device drivers of the storage module, the context data being used to dynamically modify the device drivers, the context data comprising a correlation of the storage operations and the compute operations using the timestamps of the storage operations and the timestamps of the compute operations, wherein the timestamps associated with the storage operations are correlated with the timestamps associated with the compute operations, in the context memory.

9. The object store of claim 8, further comprising a cloud system administrator module accessing storage module operations data and compute module operations data for managing operations.

10. The object store of claim 9, further comprising a debug module accessing the storage module operations data and the compute module operations data for providing a stack trace.

11. The object store of claim 8, wherein the context data is used to at least one of dynamically modify control software of the storage module and manage input/output throttling of the guest data with respect to the storage module.

12. A method comprising:
collecting context data on each of the virtual machines of the plurality of tenants, the context data comprising a process identifier and a username, a compute module that executes compute operations comprising instantiating each of the virtual machines directly on the object store without moving guest data from the object store, the context data comprising a correlation of storage operations and the compute operations using timestamps of the storage operations and timestamps of the compute operations, wherein the timestamps associated with the storage operations are correlated with the timestamps associated with the compute operations, in the context memory;
controlling storage operations for the object store relating to the guest data based on the context data, each of the compute operations and the storage operations comprising timestamps respectively;
generating correlated data that comprises correlating the compute operations of the compute module and the storage operations of the storage module using timestamps; and
outputting the correlated data to an administrator terminal.

13. The method of claim 12, further comprising:
communicating by at least one virtual machine the guest data to a storage module; and
storing the guest data in the storage module.

14. The method of claim 13, further comprising:
storing in the storage module a read-only copy of a virtual machine operating system for instantiating new instances of virtual machines; and
storing in the storage module modifications to the virtual machine in an instance image file.

15. The method of claim 14, wherein the context data is used to:
dynamically modify control software of the storage module; modify device drivers of the storage module;
manage input/output throttling of the guest data with respect to the storage module;
determine resource usage related to the guest data;
modify resource usage related to the guest data;
debug at least one of the virtual machine and the storage module; and provide a stack trace.

16. The method of claim 12, further comprising managing processing operations and the storage operations based on a clock accessible by the virtual machine and the storage module.

17. The method according to claim 12, wherein the context data further comprises a process identifier.

18. The method according to claim 12, wherein the context data further comprises a username.

19. The method according to claim 12, wherein the context data further comprises a memory identifier.

20. The method according to claim 12, wherein the context data further comprises an internal application identifier.

21. A system for processing and storing data, comprising:
a compute module running at least one virtual machine that is used to process guest data in an object store using at least one compute function that is executed directly on the object store in such a way that data is not moved from the object store, the compute module accessing a clock for managing compute operations, context data on the at least one virtual machine being collected;
a storage module communicating with the compute module and storing the guest data, the storage module accessing the context data that is used to dynamically modify control software of the storage module and to manage input/output throttling of the guest data with respect to the storage module, the storage module storing a read-only copy of a virtual machine operating system for instantiating new instances of virtual machines in the compute module, the storage module accessing the clock for managing storage operations;
a context module for correlating the compute operations of the compute module and the storage operations of the storage module using timestamps, each of the compute operations and the storage operations comprising timestamps respectively; and
a system administrator module accessing the context data for determining resource usage related to the guest data and outputting the correlated data to an administrator terminal.

* * * * *